(12) United States Patent
Kim

(10) Patent No.: US 6,549,263 B1
(45) Date of Patent: Apr. 15, 2003

(54) LIQUID CRYSTAL DISPLAY MODULE

(75) Inventor: Hyo-Jin Kim, Chinju-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 49 days.

(21) Appl. No.: 09/665,116

(22) Filed: Sep. 20, 2000

(30) Foreign Application Priority Data

Sep. 20, 1999 (KR) .............................................. 99-40355

(51) Int. Cl.[7] .............................................. G02F 1/1336
(52) U.S. Cl. ............................................................ 349/658
(58) Field of Search ............................ 349/58, 59, 60; 361/681; 348/794

(56) References Cited

U.S. PATENT DOCUMENTS 5,929,950 A * 7/1999 Matsuda ..................... 349/58
6,002,582 A * 12/1999 Yeager et al. ................ 361/681
6,064,453 A * 5/2000 Inubushi et al. .............. 349/58
6,295,103 B1 * 9/2001 Yamatani et al. ............. 349/58

* cited by examiner

*Primary Examiner*—James Dudek
(74) *Attorney, Agent, or Firm*—McKenna Long & Aldridge LLP

(57) ABSTRACT

A liquid crystal display (LCD) module includes a liquid crystal display panel having upper and lower substrate with a liquid crystal layer interposed therebetween. A backlight unit is arranged under the liquid crystal display panel. The LCD module includes an upper frame and a lower frame. The upper frame has a horizontal portion and a vertical portion, the horizontal portion pressing an edge of the liquid crystal display panel and having at least one fixing hole. The lower frame has a side wall portion and a bottom portion and accommodates the liquid crystal display panel. The bottom portion of the lower frame supports the backlight unit, and the side wall portion has at least one protruding portion at a location corresponding to the fixing hole of the upper frame.

20 Claims, 3 Drawing Sheets

LIQUID CRYSTAL DISPLAY MODULE

This aplication claims the benefit of Korean Patent Application No. 1999-40355, filed on Sep. 20, 1999, which is hereby incorporated by reference for all purposes as if fully set forth herein.

BACKGROUND OF THE INVENTION

1. Field of the Invention

The present invention relates to a liquid crystal display device, and more particularly, to a liquid crystal display module.

2. Discussion of the Related Art

In general, a liquid crystal display (LCD) module has upper and lower frames to support an LCD panel which includes upper and lower substrates with a liquid crystal layer interposed therebetween. Such upper and lower frames further give durability to the LCD module. The LCD module has high-integrated components and thus requires high reliability and high stability.

FIG. 1 is a perspective view illustrating a conventional liquid crystal display module, and FIG. 2 is a cross sectional view taken along line II—II of FIG. 1. Referring to FIGS. 1 and 2, the LCD module includes an LCD panel 100, a backlight unit 200, and upper and lower frames 12 and 16. The LCD panel 100 includes upper and lower substrates 22 and 24. An upper polarizer 23a is arranged on the upper substrate 22, and a lower polarizer 23b is arranged on the bottom surface of the lower substrate 24. The backlight unit 200 includes various kinds of sheets 20, for example, a protecting sheet, a diffusing sheet, and a prism sheet, which are stacked in the above described order. A light waveguide plate 18 directing light toward the LCD panel is arranged under the sheets. A light source is arranged under the light waveguide plate 18. The upper frame 12 is made of a metal and has a C-shaped cross section including a vertical portion 12a and a horizontal portion 12b. The vertical portion 12a has a plurality of coupling members (not shown) for coupling with the lower frame 16. The horizontal portion 12b presses an edge of the LCD panel 100. The lower frame 16 includes a side wall portion 16a and a bottom portion 16b and is made of a resin such as polyethylene terephthalate (PET). The side wall portion 16a of the lower frame 16 has a plurality of coupling members (not shown) coupled to the vertical portion 12a of the upper frame 12. The bottom portion 16b of the lower frame 16 supports the backlight unit 200. When the vertical portion 12a of the upper frame 12 is assembled to the side wall portion 16a of the lower frame 16, the LCD panel 100 and the backlight unit 200 are reliably supported.

Further, a cover shield 14 made of an adhesive material is arranged between the side wall portion 16a of the lower frame 16 and the vertical portion 12a of the upper frame 12, so that the horizontal portion 12b of the upper frame 12 may not separate from the LCD panel 100 due to an external impact, for example, generated during an impact test. Further the cover shield 14 is arranged on a bottom surface of the lower frame 16, covering the bottom surface of the lower frame 16 on which circuit elements (not shown) are located so that the circuit elements may be protected. In other words, a portion of the cover shield 14 arranged between the vertical portion 12a of the upper frame 12 and the side wall portion 16a of the lower frame 16 contains an adhesive material on both side surfaces, and a portion of the cover shield 14 arranged on the bottom surface of the lower frame 16 contains an adhesive material on only its inner surface.

The cover shield 14 has a thickness in the range of 0.1 mm to 0.3 mm and is usually made of polyethylene terephthalate (PET).

However, as is well-known, since the LCD module is usually applied to portable electronic instruments, durability is one of the most important requirements. When an external impact is applied to the LCD module (such as when the impact test is performed or when it is dropped on the ground), since the upper frame 12 is made of a metal, which quickly transfers a vibration or an impact, the load of such an impact or vibration becomes concentrated at end portions of the upper frame 12. The impact or vibration occurring in an instant is transferred to the LCD panel 100, especially to the end portions of the upper substrate 22. Accordingly, the end portions of the LCD panel 100 may be damaged.

Further, as shown in FIG. 3, because of an external impact, such as during the impact test, when the upper frame 12 becomes separated from its location and then is returned to the former location, the upper substrate 22 made of glass or other components such as an upper polarizer or wire lines, may be damaged.

For the foregoing reasons, there is a need for a liquid crystal display module having a durable structure sufficient to endure a sudden external impact or vibration.

SUMMARY OF THE INVENTION

Accordingly, the present invention is directed to a liquid crystal display module that substantially obviates one or more of the problems due to limitations and disadvantages of the related art.

An advantage of the present invention is to provide a liquid crystal display module with a high durable structure.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a liquid crystal display module, including: a liquid crystal display panel having upper and lower substrates with a liquid crystal layer interposed therebetween; a backlight unit arranged under the liquid crystal display panel; an upper frame having a horizontal portion and a vertical portion, the horizontal portion pressurizing or pressing an edge of the liquid crystal display panel and having at least one fixing hole; and a lower frame having a side wall portion and a bottom portion and accommodating the liquid crystal display panel, the bottom portion supporting the backlight unit, the side wall portion having at least one protruding portion at a location corresponding to the fixing hole of the upper frame.

The horizontal portion of the upper frame has a bent portion, the bent portion having the fixing hole. The fixing hole of the upper frame and the protruding portion of the lower frame have a substantially rectangular shape. The upper frame may be made of a metal. The upper frame may also be made of a stainless steel. The lower frame is made of polyethylene terephtalate.

By forming the fixing hole on the upper frame and the corresponding protruding portion on the lower frame, even though the external impact is applied to the LCD module, since the upper frame is not separated from its position and is firmly fixed or supported, the LCD module is reliably supported, thereby preventing a damage to the LCD module.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
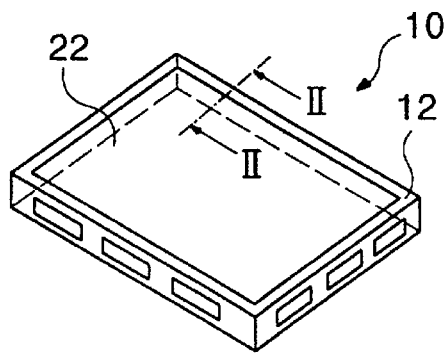
FIG. 1 is a perspective view illustrating a conventional liquid crystal display module.
Figure 2:
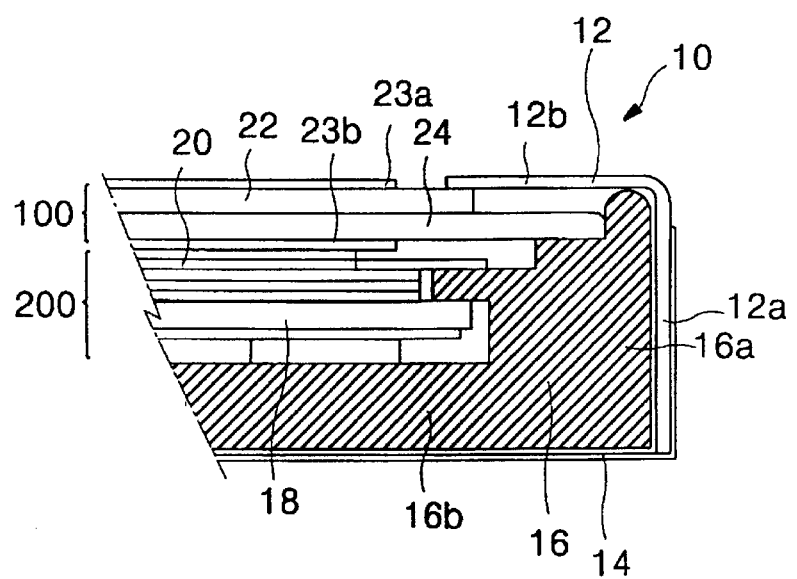
FIG. 2 is a cross sectional view taken along line II—II of FIG. 1.
Figure 3:
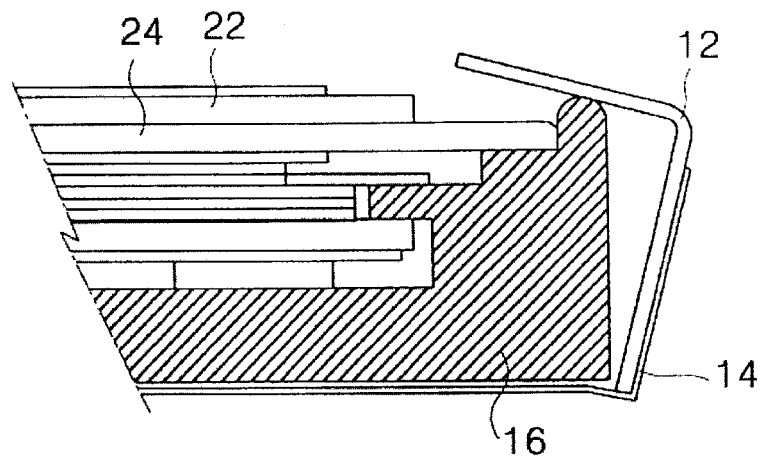
FIG. 3 is a cross sectional view illustrating a problem in the conventional liquid crystal display module.
Figure 4:
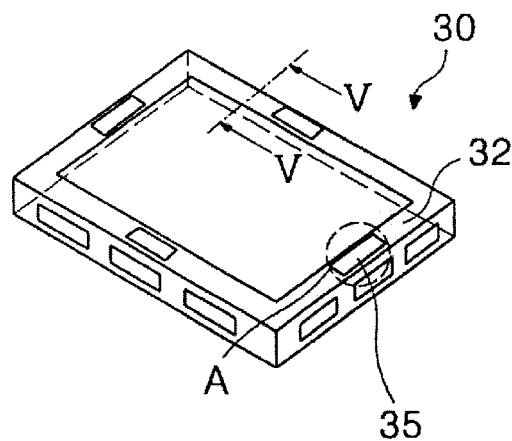
FIG. 4 is a perspective view illustrating a liquid crystal display module according to a preferred embodiment of the present invention.
Figure 5:
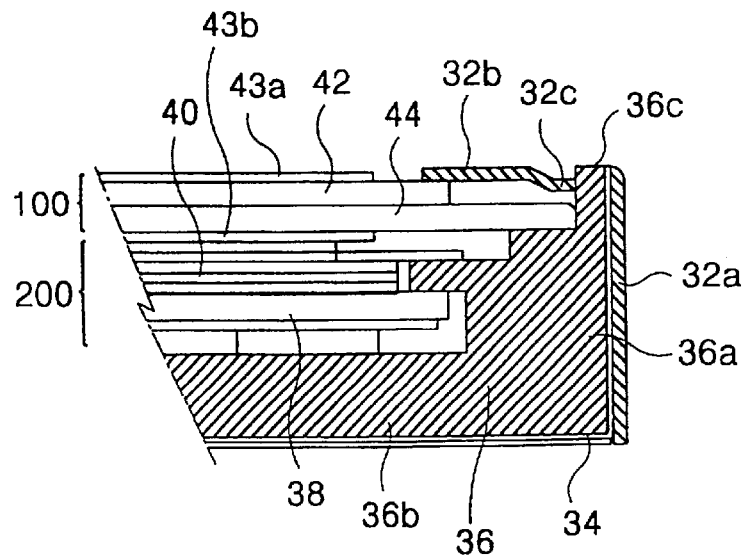
FIG. 5 is a cross sectional view taken along line V—V of FIG. 4.

FIG. 4 is a perspective view illustrating a liquid crystal display module according to a preferred embodiment of the present invention. FIG. 5 is a cross sectional view taken along line V—V of FIG. 4. Referring to FIGS. 4 and 5, the LCD module includes an LCD panel 100, a backlight unit 200, and upper and lower frames 32 and 36. The LCD panel 100 includes upper and lower substrates 42 and 44 with a liquid crystal layer (not shown) interposed therebetween. The upper substrate 42 includes a color filter, a black matrix and a common electrode (not shown), and the lower substrate 44 includes a switching element, a pixel electrode(not shown). An upper polarizer 43a is arranged on the upper substrate 42, and a lower polarizer 43b is arranged on the bottom surface of the lower substrate 44. The backlight unit 200 includes various kinds of sheets 40, for example, a protecting sheet, a diffusing sheet, and a prism sheet, which may be stacked in the above described order. A light waveguide plate 38 directing light toward the LCD panel is arranged under the sheets 40. Although not shown, a light source is arranged under the light waveguide plate 38. The upper frame 32 is made of a metal such as stainless steel and has a C-shaped cross section including a vertical portion 32a and a horizontal portion 32b. The vertical portion 32a has a plurality of coupling members (not shown) for coupling to the lower frame 36. The horizontal portion 32b presses an edge of the LCD panel 100 and has at least one fixing hole 35. A portion of horizontal portion 32b of the upper frame 32 on which fixing hole 35 is formed is preferably bent. In other words, it is preferable that the horizontal portion 32b of the upper frame 32 has a bent portion 32c and the fixing hole 35 is formed on the bent portion 32c of the upper frame 32. The lower frame 36 includes a side wall portion 36a and a bottom portion 36b and is preferably made of a resin such as polyethylene terephthalate (PET). The side wall portion 36a of the lower frame 36 has a plurality of coupling members (not shown) coupled to the vertical portion 32a of the upper frame 32. The bottom portion 36b of the lower frame 36 supports the backlight unit 200. The side wall portion 36a includes a plurality of protruding portions 36c at a location corresponding to the fixing hole 35 of the upper frame 32. Therefore, when the upper and lower frames 32 and 36 are assembled to each other, the protruding portion 36c of the lower frame 36 is inserted into the fixing hole 35, thereby preventing the horizontal portion 32b of the upper frame 32 from being separated from its location due to an external impact, for example, generated during an impact test. It is desirable that the protruding portion 36c of the lower frame 36 does not jut or project beyond the horizontal portion 32b of the upper frame 32. The bent portion 32c of the lower frame 32 provides adequate margin to the protruding portion 36c of the lower frame 36 so that the protruding portion 36c may be jutted sufficiently to fix or support the horizontal portion 32b of the upper frame 32.

Figure 6:
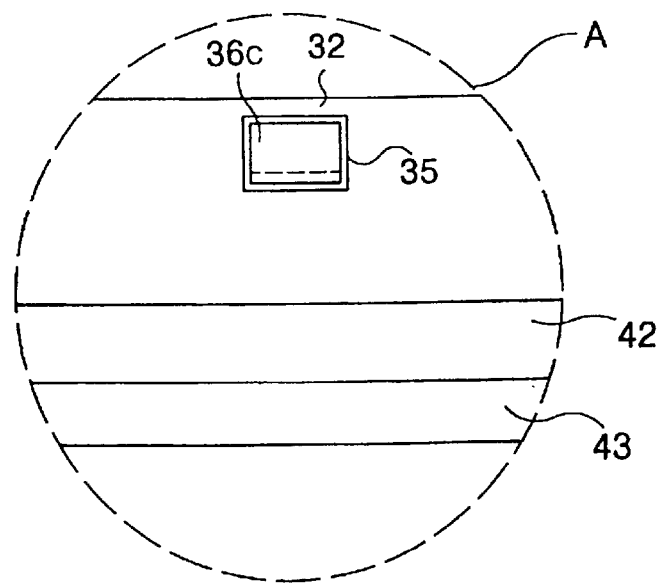
FIG. 6 is an enlarged view illustrating a portion "A" of FIG. 4.

As shown in FIG. 6, it is preferable that the fixing hole 35 and the protruding portion 36c of the lower frame 36 have a substantially rectangular shape. However, the fixing hole 35 and the protruding portion 36c may have many different shapes, including a circular shape. Thus, the present invention is not limited by the particular shape of the fixing hole.

Further, a cover shield 34 is arranged on a bottom surface of the bottom portion 36b of the lower frame 36. The cover shield covers the bottom surface of the lower frame 36 on which circuit elements (not shown) are located to protect the circuit elements. Preferably the cover shield 34 is not arranged between the vertical portion 32a of the upper frame 32 and the side wall portion 36a of the lower frame 36 to firmly fix them, but the cover shield 34 may be arranged between the vertical portion 32a of the upper frame 32 and the side wall portion 36a of the lower frame 36. The cover shield 34 contains an adhesive material on its one side surface or on both side surfaces. The cover shield 34 preferably has a thickness in the range of 0.1 mm to 0.3 mm and is usually made of polyethylene terephthalate (PET).

As described above, by forming a fixing hole on the upper frame and the corresponding protruding portion on the lower frame, the LCD module is reliably supported, thereby preventing damage to the LCD module. This is because even when an external impact is applied to the LCD module, the upper frame is not separated from its position and is firmly fixed or supported.

It will be apparent to those skilled in the art that various modifications and variation can be made in the liquid crystal display module of the present invention without departing from the spirit or scope of the invention. Thus, it is intended that the present invention cover the modifications and variations of this invention provided they come within the scope of the appended claims and their equivalents.

What is claimed is:

1. A liquid crystal display module, comprising:
   a liquid crystal display panel having first and second substrates with a liquid crystal layer between the first and second substrates;
   a backlight unit adjacent the liquid crystal display panel;
   a first frame having a first portion and a second portion, the first portion pressing an edge of the liquid crystal display panel and having at least one fixing hole; and
   a second frame having a side portion and a bottom portion and accommodating the liquid crystal display panel, the bottom portion supporting the backlight unit, the side portion having at least one protruding portion at a location corresponding to the fixing hole of the first frame.

2. The liquid crystal display module of claim 1, wherein the first portion is a horizontal portion of the first frame and has a bent portion, the bent portion having the fixing hole.

3. The liquid crystal display module of claim 1, wherein the fixing hole of the first frame and the protruding portion of the second frame have a substantially rectangular shape.

4. The liquid crystal display module of claim 1, wherein the first frame is made of a metal.

5. The liquid crystal display module of claim 4, wherein the first frame is made of stainless steel.

6. The liquid crystal display module of claim 1, wherein the second frame is made of polyethylene terephthalate.

7. The liquid crystal display module of claim 1, wherein the first frame is an upper frame and the second frame is a lower frame.

8. The liquid crystal display module of claim 1, further comprising a polarization layer on the first substrate.

9. The liquid crystal display module of claim 1, further comprising a polarization layer on the second substrate.

10. The liquid crystal display module of claim 1, wherein the backlight unit includes a plurality of optical sheets and a light guide plate.

11. A liquid crystal display module comprising:
    a liquid crystal display panel having first and second substrates with a liquid crystal layer between the first and second substrates;
    first and second polarization layers on the first and second substrates, respectively;
    a backlight unit adjacent the liquid crystal display panel;
    an upper frame having a horizontal portion and a vertical portion, the horizontal portion pressing an edge of the liquid crystal display panel and having at least one fixing element; and
    a lower frame having a side wall portion and a bottom portion and accommodating the liquid crystal display panel, the bottom portion supporting the backlight unit, the side wall portion having at least one protruding portion at a location corresponding to the fixing element of the upper frame.

12. The liquid crystal display module of claim 11, wherein the horizontal portion of the upper frame has a bent portion, the bent portion having the fixing hole.

13. The liquid crystal display module of claim 11, wherein the fixing hole of the upper frame and the protruding portion of the lower frame both have a substantially rectangular shape.

14. The liquid crystal display module of claim 11, wherein the upper frame is made of a metal.

15. The liquid crystal display module of claim 14, wherein the upper frame is made of a stainless steel.

16. The liquid crystal display module of claim 11, wherein the lower frame is made of polyethylene terephthalate.

17. A method of assembling a liquid crystal display module comprising:
    providing a liquid crystal display panel having first and second substrates with a liquid crystal layer between the first and second substrates;
    attaching a backlight unit adjacent the liquid crystal display panel;
    attaching an upper frame having a horizontal portion and a vertical portion, the horizontal portion pressing an edge of the liquid crystal display panel and having at least one fixing element; and
    attaching a lower frame having a side wall portion and a bottom portion and accommodating the liquid crystal display panel, the bottom portion supporting the backlight unit,
    wherein the side wall portion has at least one protruding portion located corresponding to the fixing element of the upper frame.

18. The method of claim 17, further comprising forming first and second polarization layers on the first and second substrates, respectively.

19. The method of claim 17, wherein the horizontal portion of the upper frame has a bent portion, the bent portion having the fixing hole.

20. The method of claim 17, wherein the fixing element of the upper frame includes a hole and the protruding portion of the lower frame has a substantially rectangular shape.

* * * * *